United States Patent

[11] 3,609,566

| [72] | Inventor | Georgy Vasilievich Roschin<br>ploschad Revoljutii 3, kv. 55, Istra<br>Moskovskoi Oblasti, U.S.S.R. |
|---|---|---|
| [21] | Appl. No. | 804,404 |
| [22] | Filed | Mar. 5, 1969 |
| [45] | Patented | Sept. 28, 1971 |

[54] DEVICE FOR TRANSFORMATION OF VOLTAGE COORDINATES IN SIMULATION OF TRANSIENTS IN COMPLEX POWER SYSTEMS
3 Claims, 3 Drawing Figs.

[52] U.S. Cl. .................................................... 328/155,
328/16, 328/103
[51] Int. Cl. ........................................................ H03b 3/00
[50] Field of Search ............................................. 328/16, 17,
18, 23, 155; 324/77 A, 77 B; 331/37, 76; 321/52

[56] References Cited
UNITED STATES PATENTS
3,495,158  2/1970  Garnett et al. ................  328/16 X

*Primary Examiner*—Donald D. Forrer
*Assistant Examiner*—B. P. Davis
*Attorney*—Waters, Roditi, Schwartz & Nissen ABSTRACT: A device for electronic analogue simulation of transients in complex power systems and for transformation of voltage coordinates including the combination of a harmonic converter, memory units and a frequency adder. In checking transients in power systems, harmonic converter includes selective filter connected to the input of the analogue memory unit through a current detector or operational amplifiers with passive networks in their feedback loops.

DEVICE FOR TRANSFORMATION OF VOLTAGE COORDINATES IN SIMULATION OF TRANSIENTS IN COMPLEX POWER SYSTEMS

The present invention relates to devices for electronic analogue simulation of transients occurring in complex power systems, and more particularly for transformation of voltage coordinates.

There exists a similar device in which the input analogue voltages are converted to harmonic signals of an appropriate phase by electronic switches and diode-capacitor networks in the feedback loops of operational amplifiers, and are then added together in an adder connected to memory units.

The quoted device suffers from a number of disadvantages. For one thing, the input analogue voltages must be applied to the coordinate transformer in two polarities, so as to make the pulses of the input electronic switches symmetrical. This calls for additional components in the form of inverters.

For another, generation of harmonic signals for each input calls for separate operational amplifiers and separate diode-capacitor networks. This makes the device complicated and impairs the accuracy of operation.

Control of harmonic converters and memory units for rotation of coordinate axes is inadequate, too.

It is, therefore, an object of the present invention eliminate the above-mentioned disadvantages.

A particular object of the invention is to provide a device for transformation of voltage coordinates in the simulation of transients in complex power systems, which uses the least possible number of computing elements and has a greater accuracy.

With these and other objects in view in a device for transformation of voltage coordinates in the simulation of transients in complex power systems, comprising a harmonic converter, memory units and a frequency adder, the harmonic converter has, according to the invention, the outputs of the electronic switched connected together and coupled to a selective filter connected to the inputs of phase detector units, while the electronic switches of the harmonic converter and of the phase detectors are connected to the frequency adder which is essentially a pulse-width (P.W.) modulator coupled to a line-voltage synchronous-frequency generator and integrator, controlled through a frequency divider from a quartz crystal oscillator, so that one of the outputs of the P.W. modulator is connected through an AND gate to a flip-flop of the integrator and the other outputs are connected through a one-shot multivibrator to the input of a summed-frequency phase-splitter the output of the frequency divider being connected to a phase-splitter of carrier frequency.

It is also preferable for the investigation of transients in power systems with balanced loading to connect the selective filter of the harmonic converter to the input of the analogue memory unit through a current detector or operational amplifiers with passive networks in their feedback loops.

A device, embodied in accordance with the present invention offers the following advantages:

it can solve complicated mathematical problems of coordinate conversion with a number of computing elements just sufficient to provide a path from a voltage source to a receiver;

it is relatively simple and can be manufactured in the form of compact units, with printed-circuit boards and semiconductor devices, with an output frequency of 50, 200, 400, or 1000 c./s. and an output voltage of ±100 volts;

it may be ganged with static AC network analyzers simulating the elements of transmission systems and loads;

in some cases, the device makes it possible to connect up full-scale systems of automatic regulation and protective relaying for the purpose of perfection and testing;

it provides a tool for studies into the transients occuring in complicated power systems, including stability studies and synchronization of generating stations operating in parallel; distribution of active and reactive power between stations, measurement of short-circuit currents, investigation of automatic field regulation, speed-governing, power-system control and protection systems, operation of power systems under impulse loads, etc.

The device provided by the invention may be used in other applications not related to power systems, where coordinate transformation is sought.

The invention will be best understood from the following description of a preferred embodiment when read in connection with the accompanying drawings wherein.

Figure 1:
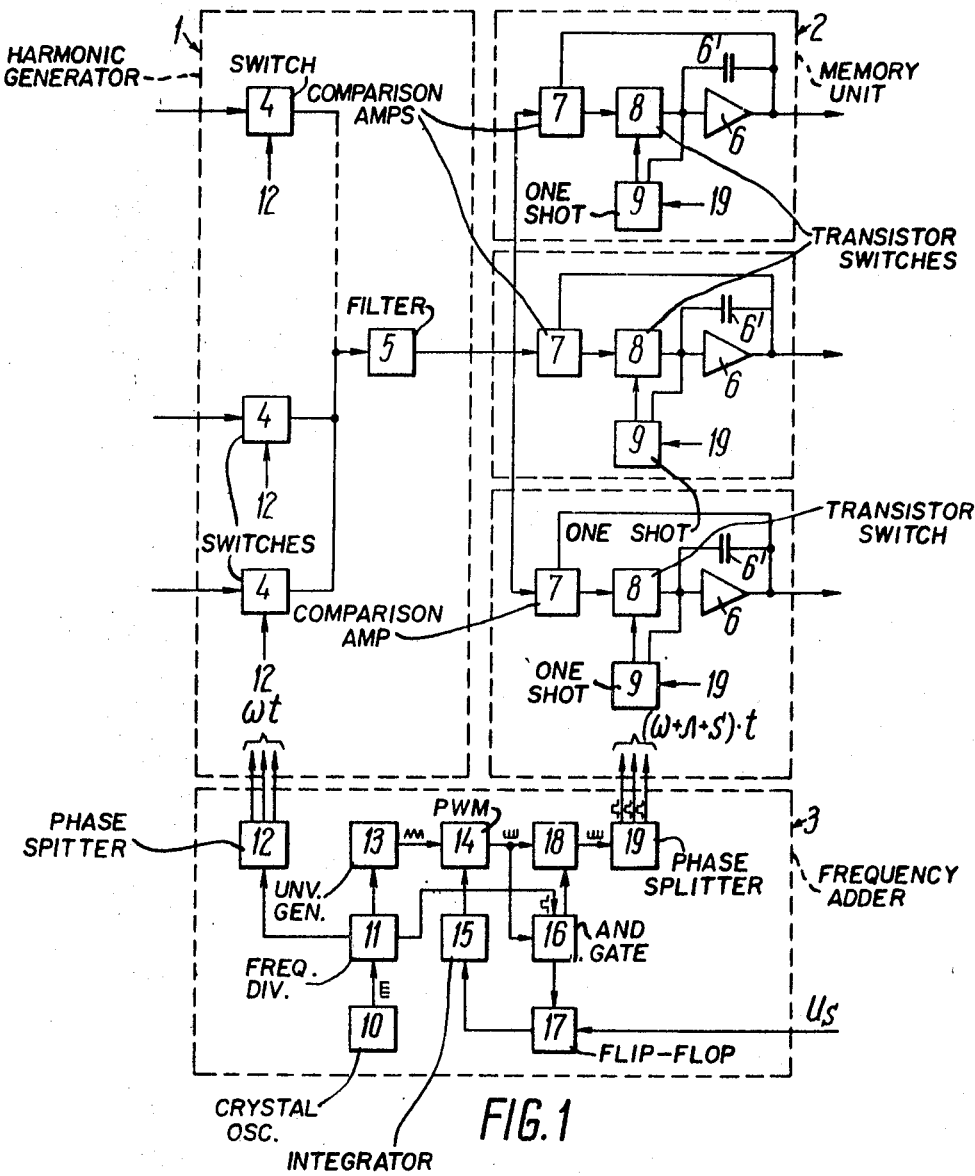
FIG. 1 is a block diagram of a voltage-coordinate transformer, according to the invention.

Referring to FIG. 1, there is a device comprising a harmonic converter 1, memory units 2, and a frequency adder 3.

The inputs of electronic switches 4 are connected to a voltage source (shown by the arrows in FIG. 1), while their outputs are connected together and to a selective filter 5, which is a parallel LC circuit (not shown in FIG. 1).

The output of the LC-filter is connected to the inputs of the memory units 2 each of which comprises an operational amplifier 6 whose feedback loop contains a memory capacitor 6', while its output is connnected to the input of a comparison amplifier 7 which is the input of the memory unit.

The output of the comparison amplifier 7 is coupled to a transistor switch 8 whose base is connected to a one-shot multivibrator 9, while the output is connected through a diode (not shown in FIG. 1) to the input of the operational amplifier 6. The other output of the one-shot multivibrator 9 is connected through a diode (not shown in FIG. 1) to the other input of the operational amplifier 6.

The electronic switches of the harmonic converter 1 and of the memory units 2 are connected to the frequency adder 3 which comprises a crystal oscillator 10 connected to a frequency divider 11. One output of the frequency divider 11 is connected to a phase-splitter 12 of carrier frequency whose outputs are connected to the electronic switches 4 of the harmonic converter 1.

The other output of the frequency divider 11 is connected through a line-voltage generator 13 to the inputs of a pulse-width (P.W.) modulator 14, the other inputs of which are connected to an integrator 15.

The third output of the frequency divider 11 is connected to an AND gate 16. The input of the integrator 15 accepts through a flip-flop 17 the voltage $V_s$ proportional to the rate of rotation of the coordinate axes. One of the outputs of the P.W. modulator 14 is connected through a one-shot multivibrator 18 to another phase-splitter 19 whose outputs are connected to the one-shot multivibrator 9 of the memory units 2.

In the exemplary embodiment of the device disclosed herein memory units can be replaced by more simple units comprising an input electronic switch connected to the electronic analogue adder through a low pass filter.

For studies in the transients occurring in power systems with balanced loading, the selective filter 5 of the harmonic converter 1 may be connected to the inputs of the memory units 2 through an electronic current detector 20 (FIG. 2) made up of operational amplifiers 21 ad 22. Through a resistor 23, the output of the amplifier 21 is connected to the common junction of resistors 24 and 24 making up the feedback loop for the operational amplifier 22. The output of the operational amplifier 22 is connected to the memory unit 2, and the common junction of the resistors 24 and 25 in its feedback loop is connected to the AC single-phase static network analyzer (shown by the arrow A in FIG. 2) designed for selecting the electric line components.

The selective filter 5 of the harmonic converter 1 may be connected to the inputs of the memory units 2 through an operational amplifier 26 (FIG. 3) with passive networks 27 in its feedback loop. The other input of the operational amplifier 26 in this case is connected to the harmonic converter of another simulator (shown by the arrow B in FIG. 3).

The voltage-coordinate transformer disclosed herein operates as follows.

Upon arrival of analogue voltages at the inputs of the harmonic converter 1, the electronic switches 4 convert them into rectangular pulses at the carrier frequency.

The switches 4 of the harmonic converter are controlled by the frequency adder 3 (the phase-splitter 12), so that the phase of the control signals differ by an angle made by the input vectors.

The transformed voltages are added together at the input of the selective filter 5. The filter 5 is made up of input and output resistors (not shown) with a tuned LC network connected to their common junction, their other ends being grounded. Fundamental harmonic signal passed only through the input and output resistors and does not pass through the LC circuit whose resistance is high for it. The upper harmonic signals pass through the input resistor and LC network which feature less resistance for these signals then the output resistance of the filter.

The first harmonic appearing across the filter 5 is a projection of the input vectors onto the vector axis rotating at the carrier frequency $\omega$ and is applied to the memory unit 2. The memory unit 2 is controlled by pulses from the frequency adder 3 (of the phase-splitter 19). The frequency of the control pulses is equal to the sum of the carrier frequency $\omega$ the synchronous frequency $\Omega$ and the slip frequency S, and their phases depend on the number of memory units.

During a small fraction of each cycle the memory units 2 register the instantaneous values of the harmonic input and store these values for the duration of the remaining portion of the cycle. Since the harmonic input is of carrier frequency $\omega$ and the memory units are controlled by the sum frequency $\omega+\Omega+$, the signals appearing at the outputs of the memory units have a difference frequency, corresponding to the speed of rotation of the rotor in the generator being simulated. The coordinate transformer disclosed herein may connect an analogue simulating the rotor circuits of synchronous machines and the motion equation of the generating unit to an AC static network analyzer.

Figure 2:
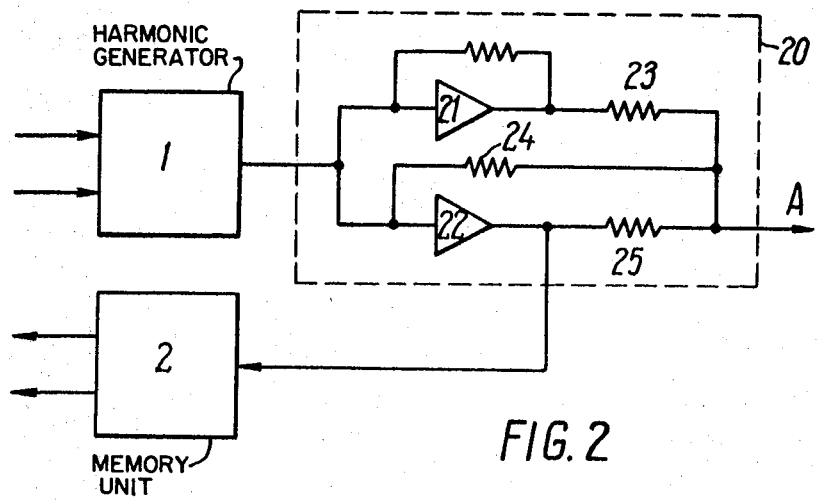
FIG. 2 is a block diagram of the device of FIG. 1, for studies into the transients occurring in power systems with balanced loading according to the static network analyzer.
Figure 3:
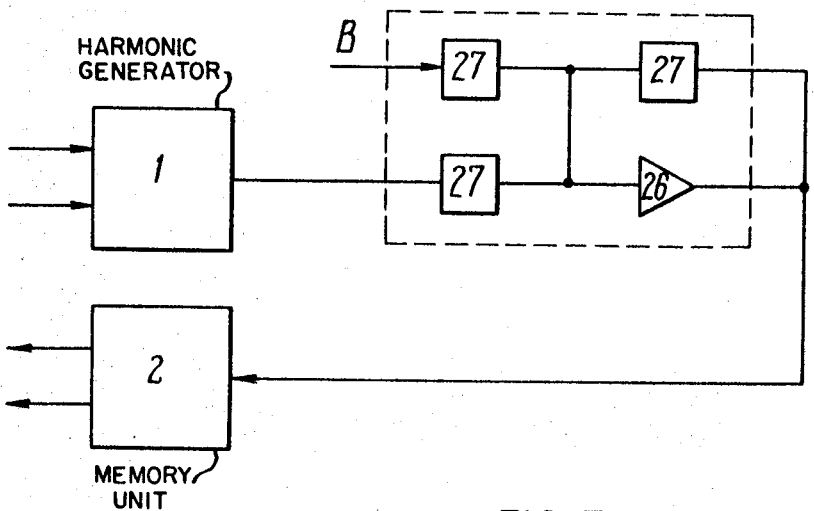
FIG. 3 is a block diagram of the device of FIG. 1, with the static network analyzer replaced by a power-system analogue.

In case of problems related to operation under balanced loading conditions near synchronous speed, such as stability of paralleled stations, it is preferable to use the modifications of FIGS. 2 and 3. In such a case, the coordinate-transformer operates as follows.

Upon arrival of analogue voltage at the inputs of the harmonic converter 1, the electronic switches 4 convert them into rectangular pulses following at the sum (synchronous + slip) frequency.

The switches 4 of the harmonic converter 1 are controlled by the frequency adder 3 (the phase-splitter 19), and the phases of the control signals differ by $\pi/2$ radians.

The sine wave voltage appearing at the output of the harmonic converter 1 is applied to the inputs of the current detector 20. The current detector 20 serves to connect the converter to an AC static network analyzer and to measure the current in that analyzer.

The parameters of the amplifiers 21 and 22 are chosen so that voltages $2v$ and $v$ appear at their outputs, respectively. If the resistances connected to the outputs of the amplifiers 21 and 22 be made of low value and uncomparable with then, feedback resistors, then, with no current flowing in the AC static network analyzer, the voltage at the output of the amplifier 22 will be zero. If a load be introduced into the AC static network analyzer, the voltage appearing at the output of the amplifier 22 will be proportional to the load current. From the amplifier 22 the load current is applied to the input of the memory unit 2. The memory units 2 are likewise controlled by pulses from the frequency adder 3. The control pulses follow at the sum of the synchronous and slip frequencies, and the phases of the control signals differ by $\pi/2$ radians.

The voltages appearing at the outputs of the memory unit are presented as components directed along the same axes as the input voltages of the harmonic converter.

The coordinate transformer disclosed herein operates in a similar manner when instead of an AC static network analyzer and a current detector use is made of analogues in the form of operational amplifiers 26 (FIG. 3) with passive networks 27 providing feedback.

What is claimed is:

1. A device for conversion of voltage coordinates in the simulation of transients in complex power systems, comprising; a harmonic converter connected to a voltage source and incorporating electronic switches whose outputs are connected together, and a selective filter connected to the common junction of said switches phase detectors made as memory units based on electronic switches, connected on the input side to the output of said selective filter in the harmonic converter, and on the output side to a voltage receiver; a frequency adder connected to said electronic switches of said harmonic converter and phase detectors for control of their phases, said frequency adder being a pulse-width modulator connected to a carrier-frequency line-voltage generator controlled through a frequency divider from a quartz crystal oscillator and an integrator; so that the outputs of said pulse-width modulators are connected through AND gates to a flip-flop of said integrator, while the other outputs are connected through a one-shot multivibrator to the input of a summed-frequency phase-splitter, the output of said frequency divider being connected to a carrier-frequency phase-splitter.

2. A device, as claimed in claim 1, in which for studies into the transients of power systems with balanced loading said selective filter of the harmonic converter is connected to the inputs of the memory units through an electronic current detector made up of two operational amplifiers whose inputs are connected together while the output of one of the operational amplifiers is connected through a resistance to the common junction of two resistors providing feedback for the other operational amplifier.

3. A device, as claimed in claim 1, in which the selective filter of the harmonic converter is connected to the inputs of said memory units through operational amplifiers with passive networks in the feedback loop, which are analogues of power-system elements.